United States Patent
Chu

(10) Patent No.: US 9,317,415 B2
(45) Date of Patent: Apr. 19, 2016

(54) APPLICATION ANALYTICS REPORTING

(71) Applicant: Google Inc., Mountain View, CA (US)

(72) Inventor: Maurice Kyojin Chu, Burlingame, CA (US)

(73) Assignee: Google Inc., Mountain View, CA (US)

( * ) Notice: Subject to any disclaimer, the term of this patent is extended or adjusted under 35 U.S.C. 154(b) by 145 days.

(21) Appl. No.: 13/908,811

(22) Filed: Jun. 3, 2013

(65) Prior Publication Data

US 2014/0359584 A1    Dec. 4, 2014

(51) Int. Cl.

| | | |
|---|---|---|
| *G06F 7/00* | (2006.01) | |
| *G06F 17/00* | (2006.01) | |
| *G06F 9/44* | (2006.01) | |
| *G06F 9/45* | (2006.01) | |
| *G06F 11/36* | (2006.01) | |
| *G06F 17/30* | (2006.01) | |
| *G06F 9/50* | (2006.01) | |
| *G06Q 10/00* | (2012.01) | |
| *G06F 9/445* | (2006.01) | |

(52) U.S. Cl.
CPC .......... *G06F 11/3692* (2013.01); *G06F 9/5072* (2013.01); *G06F 17/30592* (2013.01); *G06F 17/30867* (2013.01); *G06Q 10/00* (2013.01); *G06F 8/60* (2013.01)

(58) Field of Classification Search
CPC ............. G06Q 10/06313; G06Q 30/02; G06F 11/3447; G06F 11/3476; G06F 2209/482; G06F 2209/5019; G06F 2209/508; G06F 8/70; G06F 8/20; G06F 8/34; G06F 8/10; G06F 8/355; G06F 11/3684; G06F 11/3672; G06F 11/3604; G06F 17/30867; G06F 17/30412; G06F 17/30592; G06F 17/30861; G06F 9/5072; G06F 9/4443; G06F 9/45508; G06F 11/3452; G06F 11/3466; G06F 11/3438; G06F 11/079; G06F 11/3419; G06F 11/3404; G06F 11/3414; G06F 11/3692; G06F 11/3409
See application file for complete search history.

(56) References Cited

U.S. PATENT DOCUMENTS

| 5,961,599 A * | 10/1999 | Kalavade ............ G06F 11/3452 709/224 |
| 6,323,884 B1 * | 11/2001 | Bird .................... G06F 3/04812 715/810 |
| 6,345,387 B1 * | 2/2002 | Morrison ............ G06F 9/45508 714/E11.211 |
| 7,490,031 B1 * | 2/2009 | Qiu .......................... G06F 8/38 703/22 |

(Continued)

OTHER PUBLICATIONS

S.J. Prowell, Using Markov Chain Usage Models to Test Complex Systems, 2005 IEEE, [Retrieved on Dec. 8, 2015]. Retrieved from the internet: <URL: http://www.computer.org/csdl/proceedings/hicss/2005/2268/09/22680318c.pdf> 6 Pages (1-6).*

(Continued)

*Primary Examiner* — Thuy Dao
*Assistant Examiner* — Anibal Rivera
(74) *Attorney, Agent, or Firm* — Foley & Lardner LLP; John D. Lanza

(57) ABSTRACT

Systems and methods for application analytics reporting include comparing metrics regarding the use of the application to a usage model for the application. The usage model indicates an expected set of states of the application and transitions between the states during execution of the application. A determined difference between the metrics and the expected states and transitions indicated by the usage model that exceeds a predetermined threshold is provided as analytics data.

18 Claims, 5 Drawing Sheets

(56) References Cited

U.S. PATENT DOCUMENTS

| | | | | |
|---|---|---|---|---|
| 7,673,340 | B1* | 3/2010 | Cohen | G06F 11/3438 379/266.08 |
| 8,572,138 | B2* | 10/2013 | Sundar | G06F 8/60 707/828 |
| 8,749,569 | B2* | 6/2014 | Torii | G06F 9/4443 345/556 |
| 2003/0084053 | A1* | 5/2003 | Govrin | G06F 17/30592 |
| 2003/0101449 | A1* | 5/2003 | Bentolila | G06Q 30/0251 725/10 |
| 2004/0054501 | A1* | 3/2004 | Barthel | G06F 11/28 702/182 |
| 2004/0216097 | A1* | 10/2004 | Sun | G06F 12/121 717/154 |
| 2006/0075303 | A1* | 4/2006 | Ulrich | G06F 11/3672 714/38.14 |
| 2006/0218285 | A1* | 9/2006 | Talwar | G06F 9/5072 709/227 |
| 2007/0021968 | A1* | 1/2007 | Amir | G06Q 20/10 705/39 |
| 2007/0277155 | A1* | 11/2007 | Casey | G06F 11/3466 717/124 |
| 2008/0216055 | A1* | 9/2008 | Khatutsky | G06F 11/3409 717/127 |
| 2009/0138292 | A1* | 5/2009 | Dusi | G06Q 30/0203 705/7.32 |
| 2009/0187822 | A1* | 7/2009 | Abreu | G06F 8/61 715/700 |
| 2009/0273597 | A1* | 11/2009 | Chatamballi | G06F 11/3692 345/418 |
| 2010/0056114 | A1* | 3/2010 | Roundtree | G09B 7/02 455/414.1 |
| 2010/0229096 | A1* | 9/2010 | Maiocco | G06F 15/173 715/734 |
| 2011/0083123 | A1* | 4/2011 | Lou | G06F 11/079 717/125 |
| 2011/0119104 | A1* | 5/2011 | Levine | G06Q 30/02 705/7.25 |
| 2011/0125700 | A1* | 5/2011 | Funada | G06F 11/3414 706/50 |
| 2011/0145653 | A1* | 6/2011 | Broadfoot | G06F 11/3604 714/38.1 |
| 2011/0264663 | A1* | 10/2011 | Verkasalo | G06F 17/30867 707/740 |
| 2011/0296420 | A1* | 12/2011 | Pegushin | G06F 11/3404 718/102 |
| 2012/0198351 | A1* | 8/2012 | Lee | G06F 17/30861 715/744 |
| 2012/0259807 | A1 | 10/2012 | Dymetman | |
| 2012/0278179 | A1* | 11/2012 | Campbell | G06Q 30/0255 705/14.69 |
| 2012/0278330 | A1* | 11/2012 | Campbell | G06Q 30/02 707/740 |
| 2012/0278331 | A1* | 11/2012 | Campbell | H04N 21/44204 707/740 |
| 2012/0303569 | A1* | 11/2012 | Tuzhilin | G06F 17/30412 706/46 |
| 2012/0303676 | A1* | 11/2012 | Tuzhilin | G06F 17/30412 707/803 |
| 2012/0317070 | A1* | 12/2012 | Tuzhilin | G06F 17/30412 707/600 |
| 2012/0317370 | A1 | 12/2012 | Luna | |
| 2012/0324059 | A1* | 12/2012 | Tuzhilin | G06F 17/30412 709/219 |
| 2013/0196615 | A1* | 8/2013 | Zalmanovitch | H04W 24/02 455/405 |
| 2013/0326427 | A1* | 12/2013 | Elias | G06F 9/4443 715/854 |
| 2013/0346917 | A1* | 12/2013 | Bragdon | G06F 11/3419 715/802 |
| 2014/0180752 | A1* | 6/2014 | Kozloski | G06Q 10/06316 705/7.27 |

OTHER PUBLICATIONS

James A. Whittaker et al., A Markov Chain Model for Statistical Software Testing, Oct. 1994, [Retrieved on Dec. 8, 2015]. Retrieved from the internet: <URL: http://ieeexplore.ieee.org/stamp/stamp.jsp?tp=&arnumber=328991> 13 Pages (812-824).*

Artisan, A View From My Seat, printed from Internet address: http://useartisan.com/case-study/a-view-from-my-seat/, dated Apr. 3, 2013, 6 pages.

Google Inc., Android Native Application Tracking Overview, printed from Internet address: https://developers.google.com/analytics/devguides/collection/android/, dated Apr. 10, 2013, 1 page.

Google Inc., Mobile App Engagement, printed from Internet address: https://support.google.com/analytics/answer/2568878?hl=en, dated Apr. 3, 2013, 4 pages.

Extended European Search Report on EP 13176161.1 Dtd Dec. 13, 2013, 7 pages.

* cited by examiner

APPLICATION ANALYTICS REPORTING

BACKGROUND

As development tools continue to evolve, the number of applications available for mobile and desktop devices is rapidly increasing. Applications are now available from entities that range from amateur programmers to software companies employing thousands of software developers. The types of applications available to users are diverse, allowing users to pick and choose how they want their devices to operate. For example, a teenager may download a social media application to stay in touch with her friends. In another example, a businessman may download a productivity application to review expense reports on his mobile device.

SUMMARY

Implementations of the systems and methods for application analytics reporting are disclosed herein. One implementation is a method of providing analytics data for an application. The method includes generating, by a processor, metrics regarding use of the application on a device. The metrics include data that is indicative of a plurality of states of the application and transitions between the states during execution of the application. The method also includes comparing the metrics to a usage model for the application that indicates an expected set of states of the application and transitions between the states during execution of the application. The method further includes determining that a difference between the metrics and the expected states and transitions indicated by the usage model exceeds a predetermined threshold. The method yet further includes providing the difference between the generated metrics and the expected states and transitions indicated by the usage model as analytics data.

Another implementation is a system for providing analytics data for an application. The system includes one or more processors configured to generate metrics regarding use of the application on a device. The metrics include data indicative of a plurality of states of the application and transitions between the states during execution of the application. The one or more processors are also configured to compare the metrics to a usage model for the application that indicates an expected set of states of the application and transitions between the states during execution of the application. The one or more processors are further configured to determine that a difference between the metrics and the expected states and transitions indicated by the usage model exceeds a predetermined threshold. The one or more processors are additionally configured to provide the difference between the generated metrics and the expected states and transitions indicated by the usage model as analytics data.

A further implementation is a computer-readable storage medium having machine instructions stored therein, the instructions being executable by one or more processors to cause the one or more processors to perform operations. The operations include generating metrics regarding use of the application on a device. The metrics include data indicative of a plurality of states of the application and transitions between the states during execution of the application. The operations also include comparing the metrics to a usage model for the application that indicates an expected set of states of the application and transitions between the states during execution of the application. The operations further include determining that a difference between the metrics and the expected states and transitions indicated by the usage model exceeds a predetermined threshold. The operations also include providing the difference between the generated metrics and the expected states and transitions indicated by the usage model as analytics data.

These implementations are mentioned not to limit or define the scope of the disclosure, but to provide an example of an implementation of the disclosure to aid in understanding thereof. Particular implementations may be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Figure 1:
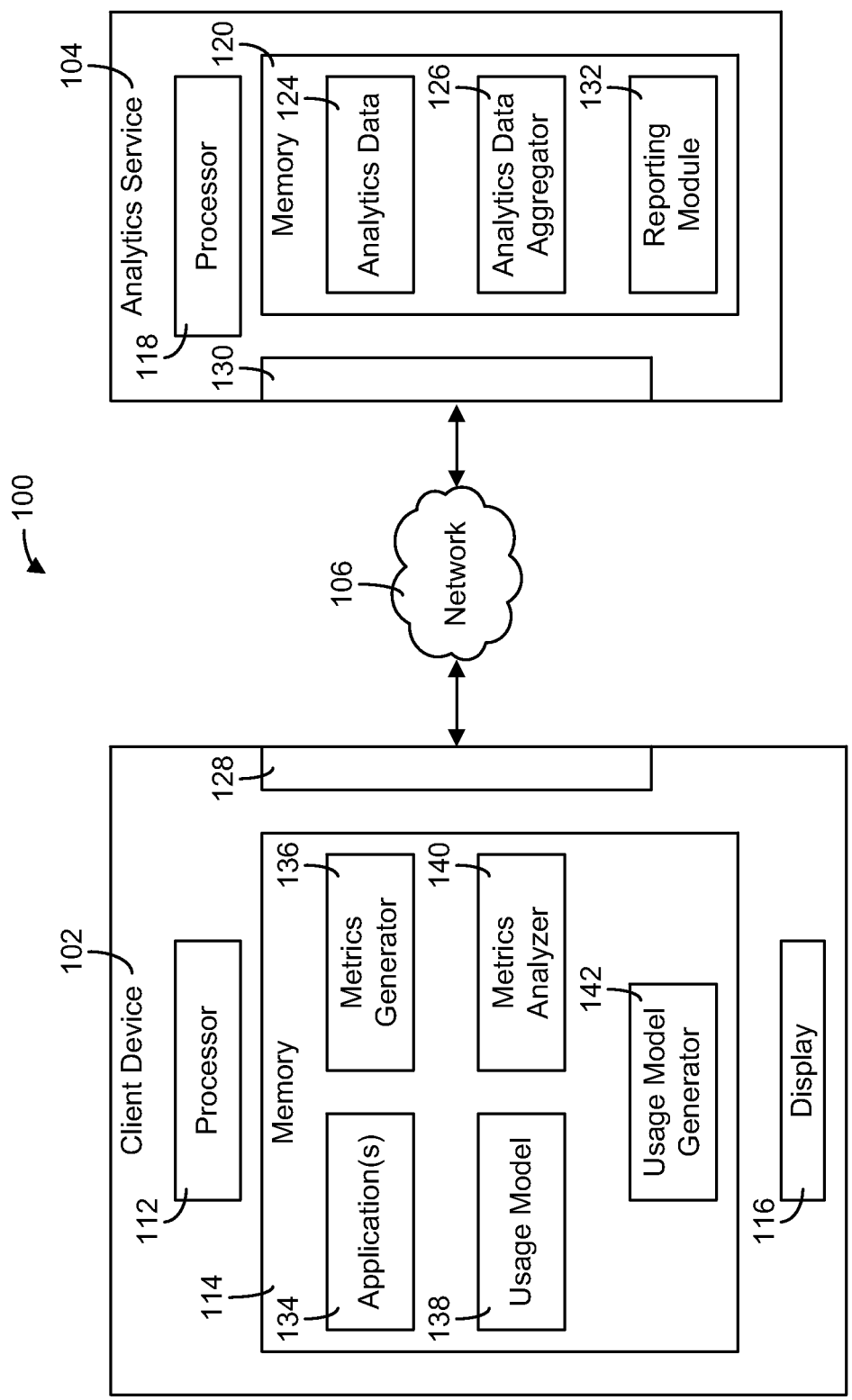
FIG. 1 is a block diagram of a computer system in accordance with various implementations.

According to some aspects of the present disclosure, a user of an application may agree to allow analytics data to be generated regarding the user's use of the application. In various implementations, the analytics data may include information regarding how the user interacts with the application. The analytics data may include information regarding the various states of the application during use (e.g., which screens or options were presented by the application), transitions that occurred between application states (e.g., state transitions that resulted from the user interacting with the application via a user interface device), or other information regarding the use of the application. For example, the analytics data may include information regarding which screens or options were presented by the application to the user, the order in which the screens or options were presented by the application, the amount of time a screen or option was presented, or information regarding the actions performed by the user within the application. To ensure the user's privacy, the analytics data may not contain any personally identifiable information regarding the actual user.

Analytics data from any number of client devices may be collected and aggregated by an analytics service, in various implementations. The analytics service may, in some cases, generate one or more reports regarding the aggregated analytics data. For example, a report from the analytics service may indicate how an average user interacts with the application. This type of report may be used by the developer of the application or another interested party to determine how users actually use the application. For example, assume that a report from the analytics service indicates that a typical user of the application transitions from screens A→B→C immediately after launching the application. Thus, many users may wish to access the features of screen C immediately after starting the application, but are forced to first navigate through screens A and B. In such a case, the developer of the application may enhance a typical user's experience with the application by modifying the application to allow the user to transition from screen A→C or even start the application at screen C.

According to various implementations, analytics data may be provided by a client device regarding atypical uses of the application. In some implementations, the client device may generate metrics regarding the use of the application and compare the metrics to a usage model. The usage model may include data regarding the expected application states and state transitions for the application. Differences between the generated metrics and the expected use of the application indicated by the model may then be provided by the client device to an analytics service for aggregation and reporting across any number of client devices. Thus, a client device may report less than the full amount of generated metrics regarding the use of the application (e.g., the device only reports on unexpected uses of the application by the user), in some implementations.

For situations in which the systems discussed here collect personal information about users, or may make use of personal information, the users may be provided with an opportunity to control whether programs or features may collect personal information (e.g., information about a user's social network, social actions or activities, a user's preferences, or a user's current location). In addition, certain data may be anonymized in one or more ways before it is stored or used, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Referring now to FIG. 1, a block diagram of a computer system 100 is shown, according to various implementations. System 100 includes a client device 102 which communicates with other computing devices, such as an analytics service 104, via a network 106. Client device 102 may execute any number of applications 134 and report analytics data 124 regarding the use of applications 134 to analytics service 104. Analytics service 104 may, in some implementations, aggregate analytics data 124 from client device 102 with analytics data from any number of other client devices received via network 106 and generate a report using the aggregated analytics data.

Network 106 may be any form of computer network that relays information between client device 102 and analytics service 104. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, client device 102 may communicate wirelessly (e.g., via WiFi, cellular, radio, etc.) with a transceiver that is hardwired (e.g., via a fiber optic cable, a CAT5 cable, etc.) to other computing devices in network 106.

Client device 102 may be any number of different types of user electronic devices configured to communicate via network 106 (e.g., a laptop computer, a desktop computer, a tablet computer, a smartphone, a digital video recorder, a set-top box for a television, a video game console, combinations thereof, etc.). Client device 102 is shown to include a processor 112 and a memory 114. Memory 114 may store machine instructions that, when executed by processor 112 cause processor 112 to perform one or more of the operations described herein. Processor 112 may include one or more microprocessors, application specific integrated circuits (ASICs), field programmable gate arrays (FPGAs), other forms of processing circuits, or combinations thereof. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ROM, RAM, EEPROM, EPROM, flash memory, optical media, or any other suitable memory from which processor 112 can read instructions.

Client device 102 may include one or more hardware interfaces 128 configured to convey data between processor 112 and another electronic device. For example, hardware interfaces 128 may include a network interface configured to receive or transmit data between client device 102 and another computing device (e.g., analytics service 104) via network 106. In various implementations, interfaces 128 may also convey data between processor 112 and one or more user interface devices of client device 102. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to the housing of client device 102 (e.g., a built-in display, microphone, etc.) or external to the housing of client device 102 (e.g., a monitor connected to client device 102, a speaker connected to client device 102, etc.), according to various implementations. For example, client device 102 may include an electronic display 116. Electronic display 116 may be configured to only receive display data from processor 112 or may be configured also to provide input received from a user of client device 102 to processor 112 (e.g., electronic display 116 may be a touch-screen display). In various implementations, display 116 may be located inside or outside of the same housing as that of processor 112 and/or memory 114. For example, display 116 may be an external display, such as a computer monitor, television set, or any other stand-alone form of electronic display. In other examples, display 116 may be integrated into the housing of a laptop computer, mobile device, or other form of computing device having an integrated display.

Analytics service 104 may be one or more electronic devices connected to network 106 that communicate with client device 102. Analytics service 104 may include a processor 118 and a memory 120 that stores instructions executable by processor 118. Analytics service 104 may also include a hardware interface 130 configured to communicate data between processor 118 and network 106. In cases in which analytics service 104 is a combination of computing devices, processor 118 may represent the collective processors of the devices and memory 120 may represent the collective memories of the devices.

Client device 102 may identify itself to analytics service 104 through the use of one or more device identifiers. Device identifiers may include, but are not limited to, cookies, universal device identifiers (UDIDs), device serial numbers, telephone numbers, or network addresses. For example, a device identifier may be set on client device 102 as part of the installation of applications 134, the setup of client device 102 (e.g., the initial configuration of the operating system of client device 102), or at any other time. Such an identifier may be used by analytics service 104 to associate analytics data 124 with client device 102.

For situations in which personal information about the user of client device 102 is collected or used to select third-party content, the user may be provided with an opportunity to control whether programs or features that may collect personal information (e.g., information about a user's social network, social actions or activities, a user's preferences, or a user's current location) do so, or an opportunity to control whether or how to receive content from analytics service 104 that may be more relevant to the user. In addition, certain data may be anonymized in one or more ways before it is stored or used by analytics service 104, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by analytics service 104.

Client device 102 may include one or more applications 134 for which analytics data 124 may be generated. Applications 134 may include, but are not limited to, word processing applications, productivity applications (e.g., scheduling applications), web browser applications, games, communication applications (e.g., email applications, messaging applications, video conferencing applications, etc.), navigation applications, social networking applications, combinations thereof, or any other form of executable applications. Applications 134 may be downloaded and installed via an application marketplace, via one of interfaces 128 (e.g., via a flash drive, serial cable, etc.), or may be preloaded on client device 102. When executed by processor 112, applications 134 may provide data to a user interface device (e.g., display data may be provided to display 116, audio data may be provided to a speaker of client device 102, etc.) and may receive data from a user interface device (e.g., from a keypad, pointing device, touch screen display, microphone, etc.).

According to various implementations, client device 102 includes a metrics generator 136 configured to generate metrics regarding the use of one or more of applications 134. In some implementations, metrics generator 136 is a library or other form of executable code that is included as part of one or more of applications 134. For example, one or more of applications 134 may be developed using a software development kit (SDK) configured to generate metrics regarding the use of an application. In further implementations, metrics generator 136 is a stand-alone application configured to monitor the execution of one or more of applications 134. In various implementations, metrics generator 136 generates data regarding the states of one or more of applications 134 and the transitions between the application states during execution of an application. In general, a state of an application may correspond to an application screen provided to display 116 or an action performed by the application. A transition between application states generally corresponds to any operation performed by the application in response to input from a user interface device. For example, one of applications 134 may transition to a new application state in response to the user of client device 102 selecting a displayed button in the application via a touch screen display. The transition to the new application state may correspond to a change in the displayed options available to the user of the application, an alert or pop-up message being displayed in the application, a new window or sub-area of a window being displayed, or a portion of the displayed screen being altered.

Metrics generated by metrics generator 136 may include any information regarding the use of one or more of applications 134. The generated metrics may include, for example, data regarding which application states resulted from the use of one or more of applications 134. The generated metrics may also include data regarding the transitions between application states, an ordering of application states based on the transitions, how long one of applications 134 stayed in a particular application state, or other such metrics. In some implementations, metrics generator 136 may calculate statistics regarding the use of one or more of applications 134. For example, metrics generator 136 may generate statistics regarding how often the user of client device 102 transitioned from one particular application state to another, how long the user stayed within a given application state, how long the user used the application, and other statistics using the generated metrics. In some implementations, metrics generator 136 may associate generated metrics with a particular time window. For example, metrics generator 136 may group metrics together that were generated within the past day, week, month, year, or any other time. A time window may also be based on one or more activities regarding applications 134. For example, a time window used by metrics generator 136 may begin as soon as its corresponding application is installed to client device 102.

According to various implementations, client device 102 includes a usage model generator 142 configured to generate a usage model 138 based on metrics generated by metrics generator 136. Usage model 138 generally includes data regarding the expected states and state transitions for one or more of applications 134. Usage model generator 142 may generate probability values representing the likelihood of a particular state transition occurring based on the metrics generated by metrics generator 136. For example, assume that one of applications 134 is a navigation application having a first state in which a user is able to view their current location and a second state in which the user is able to search for driving directions. Based on the metrics generated by metrics generator 136, metrics analyzer 140 may determine that there is a probability of 0.75 that the user of the navigation application will cause the application to transition from the first state to the second state. In one implementation, usage model 138 is a Markov chain in which probabilities are assigned to each possible state transition. The history of metrics used by usage model generator 142 may be from any window of time. For example, usage model 138 may be generated based on the first month's worth of activity after one of applications 134 was installed to client device 102. In some cases, usage model generator 142 may periodically update usage model 138 using multiple time windows. For example, usage model generator 142 may update usage model 138 every week based on the user's interaction with the application.

Client device 102 may include a metrics analyzer 140. In general, metrics analyzer 140 is configured to determine which metrics generated by metrics generator 136 are reported to analytics service 104. According to various implementations, metrics analyzer 140 compares metrics from metrics generator 136 to usage model 138 to determine whether a particular application state or state transition is expected. For example, metrics analyzer 140 may determine whether a state transition recorded by metrics generator 136 corresponds to a state transition in usage model 138 having the highest probability of occurrence from a given application state. In some implementations, metrics analyzer 140 may limit the reporting of metrics from metrics generator 136 to those metrics that are not predicted by usage model 138. In other words, metrics analyzer 140 may only report generated metrics that differ from the expected use in usage model 138 that differ by a predetermined threshold amount. Thus, the amount of data transferred by client device 102 to analytics service 104 may be reduced in comparison to client device 102 reporting all metrics generated by metrics generator 136. In some implementations, metrics analyzer 140 may still report all metrics from metrics generator 136 at certain times. For example, metrics analyzer 140 may report all metrics from metrics generator 136 until usage model 138 is generated, until a predefined time threshold is reached (e.g., one week, one month, etc. after the application was installed), in response to a request from analytics service 104, in response to a user preference set by the user of client device 102 (e.g., the user may elect to send all metrics, instead of a reduced set), or at any other time.

In some implementations, metrics analyzer 140 may report metrics from metrics generator 136 based on a determination that client device 102 has established a connection to network 106. For example, client device 102 may become disconnected from network 106 due to client device 102 being placed in an aircraft mode, network hotspots being available to client device 102, or wireless communications being disabled on client device 102 due to a low battery charge. Even without a network connection, some or all of applications 134 may be usable and metrics generator 136 may continue to generate metrics regarding their use. Regardless of the reason for the lack of connectivity to network 106, metrics analyzer 140 may store metrics generated by metrics generator 136 in memory 114 until a connection is reestablished. Metrics analyzer 140 may then report the stored metrics to analytics service 104 via network 106.

Analytics service 104 may store analytics data 124 received from client device 102 and/or other client devices via network 106 as reported metrics. For example, analytics data 124 may include data regarding the application states and transitions of one or more of applications 134 during use by client device 102. In some implementations, analytics data 124 includes all available data regarding the application states and transitions. For example, analytics data 124 may include all states and state transitions experienced by an application in a given time period after the application was first installed. In further implementations, analytics data 124 includes only a subset of metrics regarding the use of an application, such as the difference between the actual use of the application and an expected use of the application.

Analytics service 104 may include an analytics data aggregator 126 configured to aggregate analytics data 124 according to any number of categories for analytics data 124. Categories may include, but are not limited to, the types of applications, the geographic locations of client devices, or the system configurations of the client devices. For example, analytics data aggregator 126 may aggregate analytics data 124 for a particular application executed by client devices located in California. In some implementations, analytics data aggregator 126 may determine one or more statistics based on analytics data 124. For example, analytics data aggregator 126 may determine the average amount of time that a user spends in a particular application state or spends using the application in total. In another example, analytics data aggregator 126 may generate a set of most common state transitions for an application.

Analytics service 104 may include a reporting module 132 configured to generate one or more reports based on data generated by analytics data aggregator 126. For example, reporting module 132 may generate a report that indicates how a typical user interacts with a particular application. A generated report may include text and/or graphical representations of the aggregated analytics data. For example, a generated report may include a pie chart or bar graph that indicates the likelihood of different state transitions taken by users within the application. In some implementations, a report may include a comparison between the expected and actual uses of the application. For example, a report may include information regarding an abnormal use of the application by a certain percentage of its users. Reporting module 132 may be configured to provide any generated reports to another electronic device via network 106. For example, a developer of the application may operate a computing device connected to network 106 to review a report generated by reporting module 132.

In some implementations, analytics service 104 may include usage model generator 142 of client device 102. In such cases, usage model generator 142 may determine usage model 138 based on analytics data 124 received from any number of client devices. For example, usage model 138 may include data indicative of the expected application states and transitions for an application, based on data received from tens, hundreds, thousands, or even millions of client devices. In some implementations, analytics service 104 may provide usage model 138 to client device 102 via network 106. Metrics analyzer 140 may then compare metrics from metrics generator 136 to usage model 138 to determine whether the difference between the generated metrics and the expected states and transitions in usage model 138 exceed a predetermined threshold. For example, metrics analyzer 140 may only report metrics that vary by more than 5% from the expected application use indicated by usage model 138. In this case, analytics service 104 may continue to receive data regarding the unexpected or abnormal use of the application by users.

Figure 2:
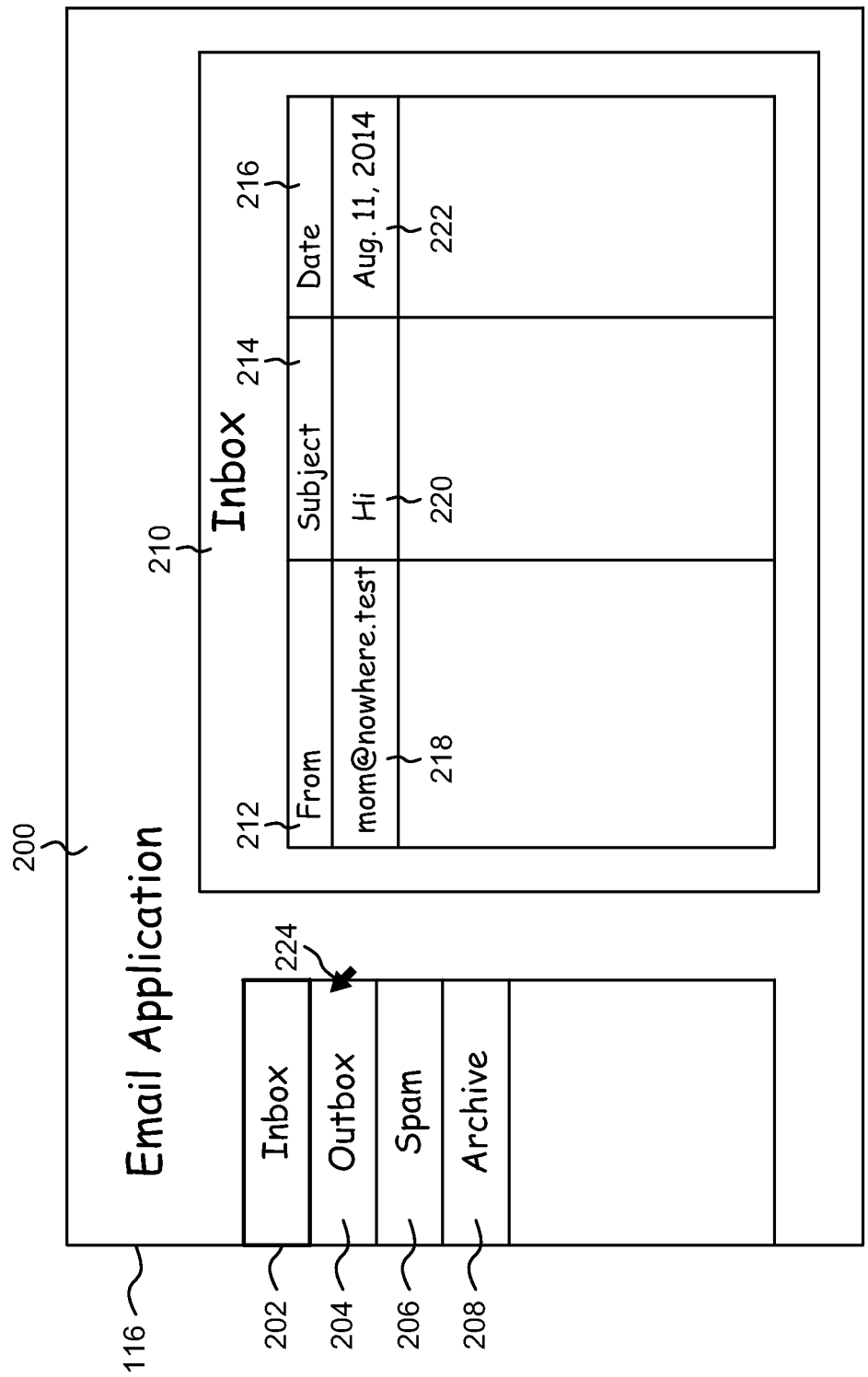
FIG. 2 depicts one implementation of an electronic display showing an application.

Referring now to FIG. 2, an illustration is shown of electronic display 116 displaying an application 200. Electronic display 116 is in electronic communication with processor 112 which causes visual indicia to be displayed on electronic display 116. As shown, application 200 is an email application that allows a user to retrieve, review, and compose email messages via an email service (e.g., a service connected to network 106). Application 200 may be executed by processor 112 that provides display data to electronic display 116. Application 200 may be part of the set of applications 134 on client device 102. While application 200 is shown to be an email application, metrics regarding any other form of application (e.g., a web browser, a communications application, a gaming application, etc.) may be generated in a similar manner.

Application 200 may be configured to receive input from a user interface device, such as a touch screen display (e.g., display 116), a pointing device, a keypad, a speaker that detects voice commands, or the like. As shown, for example, a user of client device 102 may operate a pointing device that causes a cursor 224 to change positions on electronic display 116. The user may interact with application 200 by clicking on a portion of the screen displayed on electronic display 116, entering data via a keypad, etc. In response to receiving input from a user interface device, application 200 may transition from one application state to another.

Application 200 may include various electronic buttons that may be selected via a user interface device. For example, application 200 may include selectable buttons 202-208 that correspond to an inbox (e.g., received email messages), an outbox (e.g., sent email messages), a spam folder (e.g., unwanted or unsolicited email messages), and an archive folder (e.g., email messages marked for long-term retention), respectively. In the illustration shown, button 202 is highlighted to indicate that the user has selected button 202 and that the application currently in an inbox application state. Selection of any of buttons 204-208 may cause application 200 to transition to the corresponding application state that was selected.

While in the inbox application state, application 200 may display inbox 210 in which received email messages are displayed. Inbox 210 may include various data regarding the email messages, such as the identity of a message's sender 212, the subject 214 of the message, the date 216 the message was sent, or other such information. For example, a received email message may indicate the email address 218 of the sender, the subject 220 of the message (e.g., "Hi"), and the date 222 on which the email was sent (e.g., Aug. 11, 2014). Selection of the message may also cause application 200 to transition to another application state, such as a "Read Message" application state.

Figure 3:
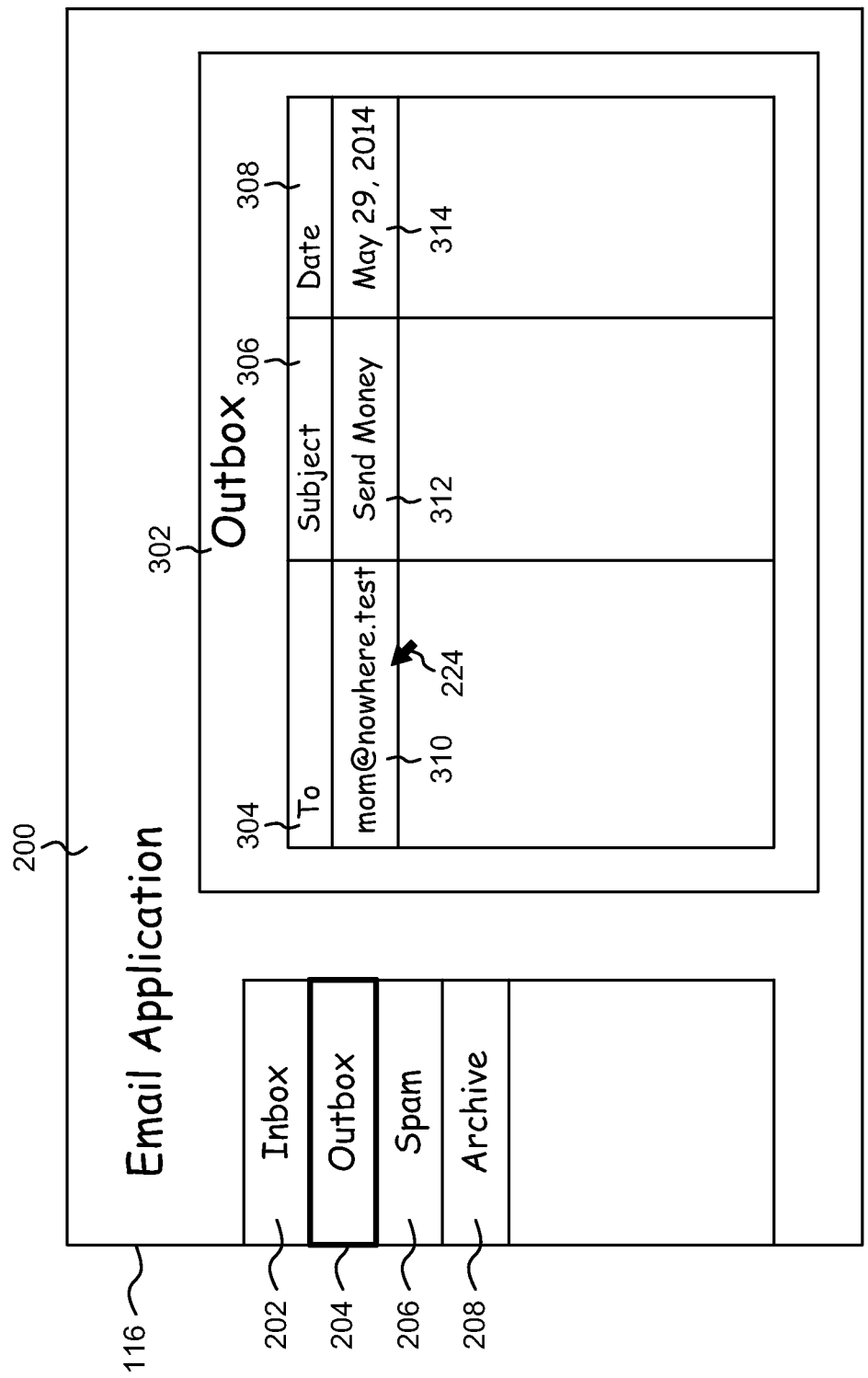
FIG. 3 depicts another application state of the application shown in FIG. 2.

Referring now to FIG. 3, application 200 is depicted in another application state than the application state shown in FIG. 2. More particularly, email application 200 is shown in an outbox application state. Application 200 may transition from the inbox state shown in FIG. 2 to the outbox state shown in FIG. 3 in response to the user of client device 102 selecting button 204. While in the outbox state, button 204 of application 200 may be highlighted to indicate that outbox 302 is being displayed. Outbox 302 may include various data regarding a sent email message, such as the destination email address 304 of the message, the subject 306 of the message, the date 308 the message was sent, or other such data. For example, outbox 302 may indicate that a particular email message was sent to email address 310 (e.g., mom@nowhere.test), with subject 312 (e.g., "Send Money") on the indicated date 314 (e.g., May 29, 2014).

According to various implementations, metrics generator 136 may generate metrics regarding the application states and state transitions that result from the user of client device 102 using application 200. For example, metrics generator 136 may generate data indicative of the user of application 200 navigating from the inbox application state to the outbox application state by selecting button 204. In some implementations, metrics analyzer 140 may compare the generated metrics to usage model 138, to determine whether the application states and state transitions are expected (e.g., whether the user or a set of users typically navigate from their inbox to their outbox). If the states and state transitions in the generated metrics differ from those predicted by the model by a threshold amount, client device 102 may report the difference to analytics service 104.

Figure 4:
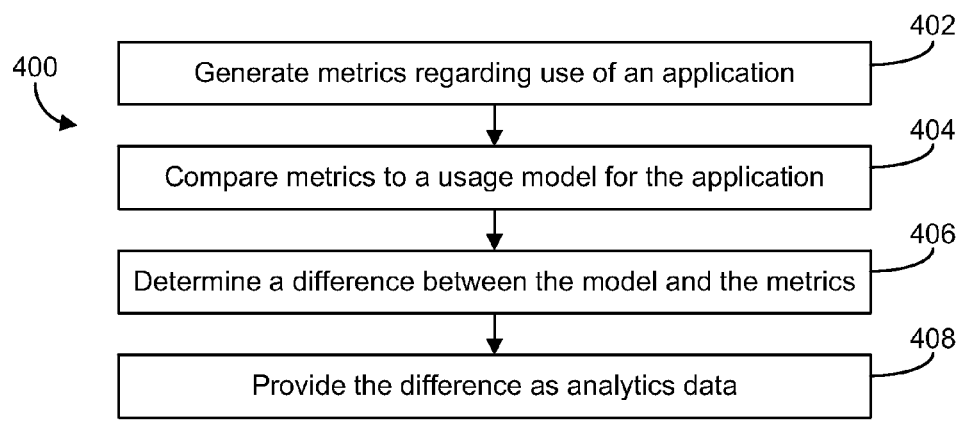
FIG. 4 is a flow diagram depicting the steps taken in one implementation of a process for providing analytics data regarding the use of an application.

Referring now to FIG. 4, a flow diagram depicting the steps taken in one implementation of a process 400 for providing analytics data regarding the use of an application is shown. Process 400 includes generating metrics regarding the use of an application (step 402), comparing the generated metrics to a usage model for the application (step 404), determining the difference between the model and the metrics (step 406), and providing the difference as analytics data (step 408). Process 400 may be implemented by a processor of an electronic device (e.g., client device 102 shown in FIG. 1) executing machine instructions stored in a memory. In general, process 400 allows analytics data regarding the use of an application transmitted to an analytics service to be throttled or otherwise limited to data that differs from an expected use of the application by a user. Thus, the power consumption and network usage by the client device reporting the analytics data may be reduced by implementing process 400.

Referring still to FIG. 4 and in greater detail, process 400 includes generating metrics regarding the use of an application (step 402). According to various implementations, the generated metrics may include information regarding the states of the application during use and the transitions between the states. In some cases, the generated metrics also include an ordering to the state transitions. An application state transition may correspond to the application performing an operation in response to input from a user interface device, in response to data from another application or computing device, after a predefined amount of time, or at any other time. Some state transitions may be perceptible by the user of the application (e.g., a change in the displayed application screen, etc.) while other state transitions may be internal to the application and hidden from the user. The metrics may be generated by the application itself (e.g., by the code of the program, a library used by the program, etc.) or by an application configured to monitor the execution of the application. In some cases, the metrics may be generated by periodically determining the state of the application. For example, the state of the application may be polled every second, five seconds, or at any other periodic amount of time.

Process 400 includes comparing the generated metrics to a usage model for the application (step 404). In various implementations, the usage model includes data indicative of the expected application states and state transitions based on a history of use of the application. In some implementations, the usage model may be generated based on a history of the use of the application for which the metrics were generated in step 402. For example, the usage model may be generated locally by client device 102 shown in FIG. 1. In other implementations, the usage model may be generated remotely and provided to the client device. For example, analytics service 104 shown in FIG. 1 may generate a usage model using analytics data from any number of different client devices and provide the usage model to client device 102. The expected set of application and state transitions in the usage model may be represented by probabilities, in some cases, that are calculated using the history of the application's use. For example, the usage model may include data regarding the probabilities of a state transition from state A to state B. In such cases, the state transitions having the highest probabilities in the usage model may correspond to the expected state transitions during use of the application. The usage model may be, for example, a Markov chain or other model that represents possible states and state transitions for the application.

Process 400 includes determining a difference between the model and the metrics (step 406). In some implementations, the difference may be determined by comparing the ordering of the state transitions in the generated metrics and the expected state transitions in the usage model. For example, the path in the usage model having the highest probability of occurrence may be A→B→C. However, the generated metrics regarding the use of the application may indicate that the user actually caused the application to transition from A→C→B. In such a case, the second and third states (e.g., C and B) may be identified as being different than the expected case in the usage model. For example, metrics analyzer 140 in FIG. 1 may determine whether metrics generated by metrics generator 136 differ from the expected metrics included in usage model 138. According to various implementations, the difference between the model and the metrics may be compared to a predefined threshold to determine whether the difference should be reported to an analytics service. For example, metrics analyzer 140 may compare the statistical difference between the observed and expected state transitions to a threshold value, to determine whether the difference is statistically significant. The threshold value may be based in part on the probabilities in the usage model associated with the state transitions. For example, assume that one application state in the usage model has two possible state transitions with the first transition having a probability of 51% and the second transition having a probability of 49%. In some cases, occurrences of the second transition in the generated metrics may fall below a predefined threshold (e.g., a threshold of 5%) and may not be considered to be a statistically significant difference for purposes of reporting analytics data.

Process 400 includes providing the difference as analytics data (step 408). When a difference between the expected use in the usage model and the generated metrics is determined, the difference may be provided as analytics data. For example, metrics analyzer 140 of client device 102 shown in FIG. 1 may provide the difference between usage model 138 and metrics generator 136 to analytics service 104 via network 106. In some implementations, the difference may be retained locally by the client device until the client device has a network connection. For example, a mobile client device may retain difference data until it has a cellular or WiFi connection to the Internet. According to various implementations, the entirety of the metrics generated regarding the use of the application may be provided during a predefined time window and the differences between the actual use and expected use provided thereafter. For example, an application may initially report all generated metrics regarding its use to an analytics service after installation of the application. After a set period of time, the application may switch to reporting on unexpected application states and state transitions, thereby reducing the amount of analytics data reported. In some implementations, the reporting of generated metrics may only be performed if the metrics correspond to an acceptable period of time. In other words, metrics generated while a device has been offline below an acceptable amount or above an acceptable amount may not be provided in some implementations.

Figure 5:
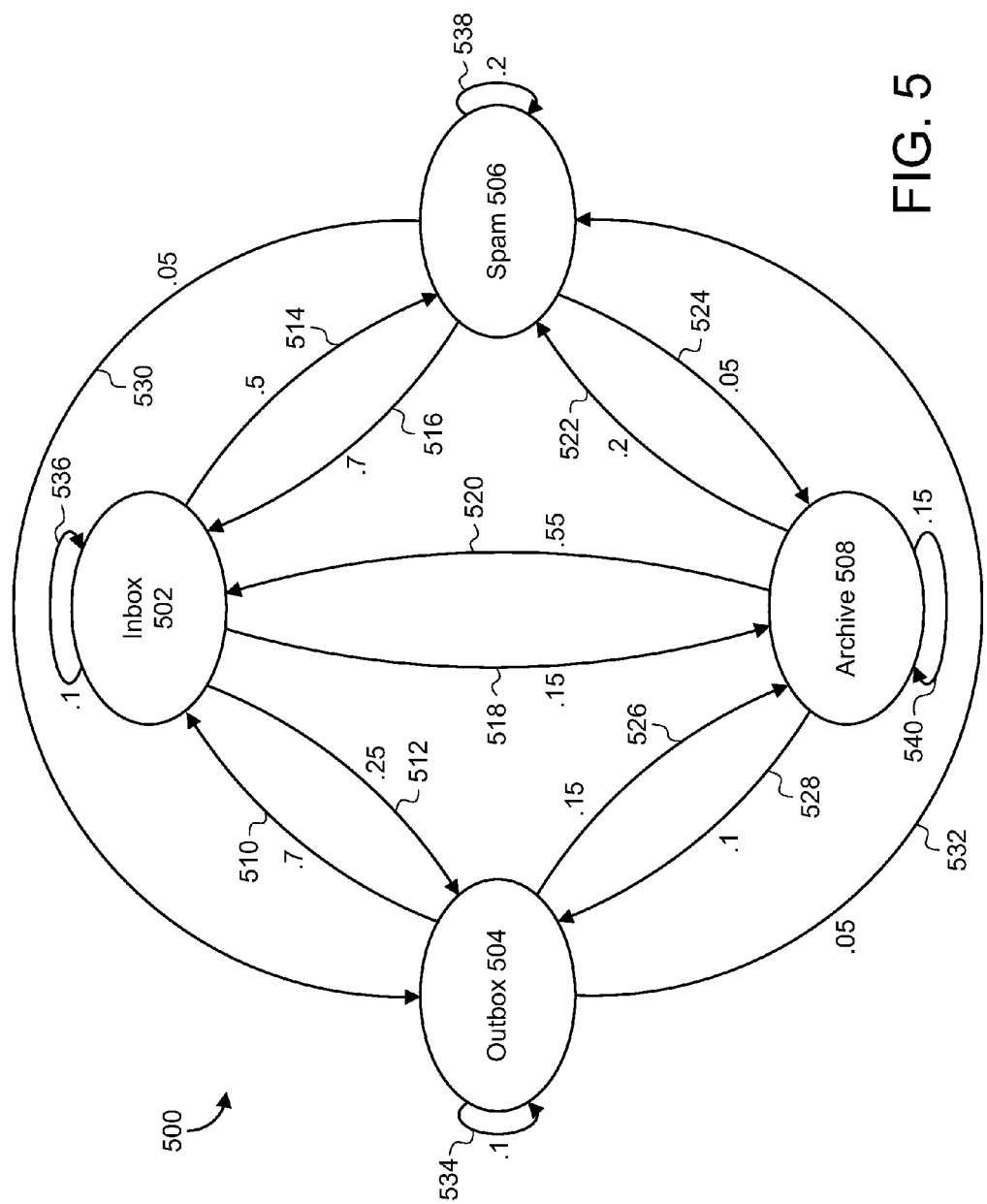
FIG. 5 is a graphical representation of a usage model for an application, according to some implementations.

Referring now to FIG. 5, a graphical representation of a usage model 500 for an application is shown, according to some implementations. As shown, usage model 500 may be generated based on usage metrics regarding the application. Usage model 500 may be generated using metrics from the local client device or may be generated using metrics from any number of client devices, in various implementations. For example, usage model 500 may be generated by usage model generator 142 of client device 102 shown in FIG. 1. In another example, usage model 500 may be generated by analytics service 104 using metrics from any number of client devices and provided to client device 102. In general, usage model 500 includes information regarding the expected state transitions during use of the application. Subsequent usage metrics that differ from the expected state transitions in usage model 500 by a threshold amount may then be reported by the client device to the analytics service.

Usage model 500 may be implemented as a directed graph (e.g., a digraph) in which nodes in the graph represent different application states and directed edges of the graph connecting nodes represent state transitions within the application. According to some implementations, usage model 500 may be a Markov chain or other data structure in which probabilities are assigned to the different state transitions. As shown, nodes 502-508 in usage model 500 represent different application states for the email application 200 shown in FIGS. 2-3. For example, node 502 may correspond to the application state in which the user's inbox is shown, node 504 may correspond to the application state in which the user's outbox is shown, node 506 may correspond to the application state in which the user's spam folder is shown, and node 508 may correspond to the application state in which the user's archive folder is shown.

Usage model 500 may also include directed edges 510-540 which represent possible state transitions in the application. For example, the application transitioning from the inbox state (e.g., node 502) to the outbox state (e.g., node 504) to the archive folder state (e.g., node 508) to the spam folder state (e.g., node 506) and back to the inbox folder state may be represented in usage model 500 by edges 512, 526, 522, and 516, respectively. Similarly, the application transitioning the states in the opposite order may be represented by edges 514, 524, 528, and 510, respectively. Other possible state transitions include the transition from the inbox state (e.g., node 502) to the archive folder state (e.g., node 508), as represented by edge 518, the opposite state transition represented by edge 520, the transition from the outbox state (e.g., node 504) to the spam folder state (e.g., node 506), as represented by edge 532, or the opposite state transition represented by edge 530. In some implementations, application states may be sampled in discrete time, leading to the possibility of the application remaining in a particular application state across different sampling intervals. In such cases, the application remaining in a particular application state (e.g., nodes 502-508) across sampling intervals may be represented in usage model 500 as edges 536, 534, 538, and 540, respectively.

According to various implementations, edges 510-540 representing state transitions in usage model 500 may be associated with probability values that represent the likelihood of a particular state transition occurring during use of the application. The probabilities may be generated, for example, based on a history of use of the application by one or more client devices. In some implementations, the probabilities in usage model 500 may be defined as follows:

$$P(X_{n+1}=x|X_1=x_1,X_2=x_2,\ldots,X_n=x_n)=\\P(X_{n+1}=x|X_n=x_n)$$

where $X_i$ represent random variables. The set of possible values for the random variables may correspond to nodes 502-508 in usage model 500. As shown, the probabilities associated with edges 510-540 are as follows:

TABLE 1

| Start Node | End Node | Graph Edge | Probability |
| --- | --- | --- | --- |
| Node 502 | Node 504 | Edge 512 | 0.25 |
| Node 502 | Node 506 | Edge 514 | 0.50 |
| Node 502 | Node 508 | Edge 518 | 0.15 |
| Node 502 | Node 502 | Edge 536 | 0.10 |
| Node 504 | Node 502 | Edge 510 | 0.70 |
| Node 504 | Node 506 | Edge 532 | 0.05 |
| Node 504 | Node 508 | Edge 526 | 0.15 |
| Node 504 | Node 504 | Edge 534 | 0.10 |
| Node 506 | Node 502 | Edge 516 | 0.70 |
| Node 506 | Node 504 | Edge 530 | 0.05 |
| Node 506 | Node 508 | Edge 524 | 0.05 |
| Node 506 | Node 506 | Edge 538 | 0.20 |
| Node 508 | Node 502 | Edge 520 | 0.55 |
| Node 508 | Node 504 | Edge 528 | 0.10 |
| Node 508 | Node 506 | Edge 522 | 0.20 |
| Node 508 | Node 508 | Edge 540 | 0.15 |

Based on the probabilities associated with edges 510-540, expected state transitions within the application may be identified. For example, if the application is currently in the outbox state (e.g., node 504), the most likely state transition would be to the inbox state (e.g., node 502), based on edge 510 having the highest associated probability. Probabilities associated with different state transitions may also be combined, in some implementations. For example, a probability may be associated with the transition from the outbox state to the inbox state to the spam folder state based on the probabilities associated with edges 510 and 514.

According to various implementations, generated metrics regarding the use of the application may be compared to usage model 500 to determine whether the observed use differs from the expected use by a threshold amount. In some implementations, the difference between the probability associated with the most likely state transition and the actual state transition may be compared to the threshold value. For example, edge 514 representing the state transition between the inbox state and the spam folder state has the highest probability. If the application transitions from the inbox state to the outbox state, however (e.g., edge 512), the difference in the probabilities may be compared to a threshold amount to determine whether the difference is statistically significant. In some implementations, the probabilities for single state transitions may be combined and used to determine whether a particular chain of state transitions is considered to be abnormal or unexpected. Analytics reporting may thus be limited to only those states and state transitions observed during use of the application that differ from the expected by a threshold amount.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product embodied on a tangible medium or packaged into multiple such software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method of providing analytics data for an application comprising:

generating, by a processor, metrics regarding use of the application on a device, the metrics including data indicative of a plurality of states of the application and transitions between the states during execution of the application;

comparing the metrics to a usage model for the application that indicates an expected set of states of the application and transitions between the states during execution of the application;

determining a first portion of the metrics for which a difference between the first portion of the metrics and the expected states and transitions indicated by the usage model exceeds a predetermined threshold and a second portion of the metrics for which a difference between the second portion of the metrics and the expected states and transitions indicated by the usage model is within the predetermined threshold;

choosing the first portion of the metrics to be reported to an external device responsive to determining the difference between the first portion of the metrics and the expected states and transitions indicated by the usage model exceeds the predetermined threshold; and transmitting to the external device the first portion of the metrics in response to a determination that the generated metrics correspond to at least a predetermined length of time.

2. The method of claim 1, further comprising:
constructing the model using a history of states and state transitions for the application.

3. The method of claim 2, wherein constructing the model comprises generating a Markov chain using the history of states and state transitions for the application.

4. The method of claim 2, wherein the history of states and state transitions for the application comprise data generated by a plurality of devices executing the application.

5. The method of claim 1, further comprising:
   transmitting the first portion of the generated metrics in response to a determination that the device has established a network connection.

6. The method of claim 1, wherein the transitions between the states of the application correspond to operations performed by the application in response to input from a user interface device.

7. The method of claim 1, wherein determining a difference between the metrics and the expected states and transitions indicated by the usage model comprises:
   determining whether the metrics exceed one or more probability thresholds associated with the expected states and transitions.

8. A system for providing analytics data for an application comprising one or more processors configured to:
   generate metrics regarding use of the application on a device, the metrics including data indicative of a plurality of states of the application and transitions between the states during execution of the application;
   compare the metrics to a usage model for the application that indicates an expected set of states of the application and transitions between the states during execution of the application;
   determine a first portion of the metrics for which a difference between the first portion of the metrics and the expected states and transitions indicated by the usage model exceeds a predetermined threshold and a second portion of the metrics for which a difference between the second portion of the metrics and the expected states and transitions indicated by the usage model is within the predetermined threshold;
   choose the first portion of the metrics to be reported to an external device responsive to determining the difference between the first portion of the metrics and the expected states and transitions indicated by the usage model exceeds the predetermined threshold; and
   transmit to the external device the first portion of the metrics in response to a determination that the generated metrics correspond to at least a predetermined length of time.

9. The system of claim 8, wherein the one or more processors are configured to:
   construct the model using a history of states and state transitions for the application.

10. The system of claim 9, wherein constructing the model comprises generating a Markov chain using the history of states and state transitions for the application.

11. The system of claim 9, wherein the history of states and state transitions for the application comprise data generated by a plurality of devices executing the application.

12. The system of claim 8, wherein the one or more processors are configured to:
   transmitting the first portion of the generated metrics in response to a determination that the device has established a network connection.

13. The system of claim 8, wherein the transitions between the states of the application correspond to operations performed by the application in response to input from a user interface device.

14. The system of claim 8, wherein the one or more processors are configured to determine a difference between the metrics and the expected states and transitions indicated by the usage model by determining whether the metrics exceed one or more probability thresholds associated with the expected states and transitions.

15. A non-transitory computer-readable storage medium having machine instructions stored therein, the instructions being executable by one or more processors to cause the one or more processors to perform operations comprising:
   generating metrics regarding use of the application on a device, the metrics including data indicative of a plurality of states of the application and transitions between the states during execution of the application;
   comparing the metrics to a usage model for the application that indicates an expected set of states of the application and transitions between the states during execution of the application;
   determining a first portion of the metrics for which a difference between the first portion of the metrics and the expected states and transitions indicated by the usage model exceeds a predetermined threshold and a second portion of the metrics for which a difference between the second portion of the metrics and the expected states and transitions indicated by the usage model is within the predetermined threshold;
   choosing the first portion of the metrics to be reported to an external device responsive to determining the difference between the first portion of the metrics and the expected states and transitions indicated by the usage model exceeds the predetermined threshold; and
   transmitting to the external device the first portion of the metrics in response to a determination that the generated metrics correspond to at least a predetermined length of time.

16. The non-transitory computer-readable storage medium of claim 15, wherein the operations further comprise:
   constructing the model using a history of states and state transitions for the application.

17. The non-transitory computer-readable storage medium of claim 15, wherein the operations further comprise:
   transmitting the first portion of the generated metrics in response to a determination that the device has established a network connection.

18. The non-transitory computer-readable storage medium of claim 16, wherein constructing the model comprises generating a Markov chain using the history of states and state transitions for the application.

* * * * *